(12) United States Patent
Lavine et al.

(10) Patent No.: US 11,902,637 B2
(45) Date of Patent: Feb. 13, 2024

(54) BEAM DIRECTOR INTERMEDIATE ALIGNMENT TARGET ASSEMBLY CONFIGURATION

(71) Applicant: Raytheon Company, Waltham, MA (US)

(72) Inventors: Jason R. Lavine, McKinney, TX (US); Liam T. Skoyles, Allen, TX (US)

(73) Assignee: Raytheon Company, Tewksbury, MA (US)

( * ) Notice: Subject to any disclaimer, the term of this patent is extended or adjusted under 35 U.S.C. 154(b) by 217 days.

(21) Appl. No.: 17/233,279

(22) Filed: Apr. 16, 2021

(65) Prior Publication Data

US 2022/0337763 A1 Oct. 20, 2022

(51) Int. Cl.
*H04N 23/11* (2023.01)
*G02B 27/10* (2006.01)
(Continued)

(52) U.S. Cl.
CPC ......... *H04N 23/11* (2023.01); *G02B 27/1013* (2013.01); *G02B 27/14* (2013.01); *H04N 17/002* (2013.01); *G02B 7/04* (2013.01)

(58) Field of Classification Search
CPC .. H04N 23/11; H04N 17/002; G02B 27/1013; G02B 27/14; G02B 7/04;
(Continued)

(56) References Cited

U.S. PATENT DOCUMENTS

| 4,569,591 A | 2/1986 | Ford et al. |
| 6,765,663 B2 * | 7/2004 | Byren ............ F41G 3/326 250/342 |

(Continued)

FOREIGN PATENT DOCUMENTS

| JP | 2002239761 A | 8/2002 |
| JP | 2003305577 A | 10/2003 |
| WO | 2017213722 A1 | 12/2017 |

OTHER PUBLICATIONS

International Search Report and Written Opinion of the International Searching Authority dated Jul. 7, 2022 in connection with International Patent Application No. PCT/US2022/022560, 16 pages.

*Primary Examiner* — Boubacar Abdou Tchoussou

(57) ABSTRACT

An apparatus includes imaging optics having an objective lens configured to focus electromagnetic radiation to an intermediate image plane and one or more optical devices configured to generate an optical beam from the electromagnetic radiation. The apparatus also includes at least one imaging sensor configured to capture an image from the optical beam. The apparatus further includes a beam generator configured to generate and transmit an HEL beam through the imaging optics. In addition, the apparatus includes an intermediate alignment target configured to be moveably positioned at the intermediate image plane. The intermediate alignment target includes a first-wavelength target configured to reflect a first spectral band of the HEL beam to a first of the at least one imaging sensor (the first imaging sensor configured to capture a first-wavelength infrared image of the first spectral band) and transmit remaining spectral portions of the HEL beam towards the objective lens.

20 Claims, 8 Drawing Sheets

(51) Int. Cl.
*G02B 27/14* (2006.01)
*H04N 17/00* (2006.01)
*G02B 7/04* (2021.01)

(58) Field of Classification Search
CPC ..... F41H 13/005; G01J 1/0266; G01J 3/0286; G01J 3/0289; G01J 3/36; F41G 3/32
See application file for complete search history.

(56) References Cited

U.S. PATENT DOCUMENTS

| | | | |
|---|---|---|---|
| 8,692,995 B2* | 4/2014 | Barth | F41G 7/004 |
| | | | 250/221 |
| 9,273,241 B2* | 3/2016 | Chomont | H04N 25/48 |
| 9,689,669 B2* | 6/2017 | Ross, Jr. | G01J 3/0286 |
| 10,337,857 B2* | 7/2019 | Skoyles | G01J 3/0229 |
| 10,436,640 B2 | 10/2019 | Skoyles et al. | |
| 11,269,169 B2* | 3/2022 | Hillman | G01J 3/2803 |
| 2011/0026012 A1* | 2/2011 | Barth | G02B 13/14 |
| | | | 356/51 |
| 2016/0136756 A1 | 5/2016 | Ogura et al. | |
| 2016/0305774 A1 | 10/2016 | Ross, Jr. et al. | |
| 2017/0268928 A1 | 9/2017 | Chow et al. | |
| 2019/0113386 A1 | 4/2019 | Skoyles et al. | |

\* cited by examiner

BEAM DIRECTOR INTERMEDIATE ALIGNMENT TARGET ASSEMBLY CONFIGURATION

TECHNICAL FIELD

This disclosure relates generally to beam alignment devices and processes. More specifically, this disclosure relates to a beam director intermediate alignment target assembly configuration.

BACKGROUND

Electro-optical (EO) systems are used in a variety of applications, such as imaging, targeting, ranging, tracking, surveillance, and reconnaissance, among other civilian and defense-related applications. In many of these systems, multiple imaging sensors sharing a common image plane produce respective images of a viewed target or scene. In certain multi-spectral electro-optical systems, different imaging sensors within the system are receptive to different spectral bands of electromagnetic radiation or light. These different spectral images allow an operator to detect and identify target characteristics that may otherwise be concealed when viewing the target in a single, narrower spectral band. Mutual alignment of the various imaging sensors within the system helps to ensure that the fields of view (FOVs) of the respective sensors are aligned.

SUMMARY

This disclosure provides a beam director intermediate alignment target assembly configuration.

In a first embodiment, an apparatus includes imaging optics having (i) an objective lens configured to focus electromagnetic radiation to an intermediate image plane and (ii) one or more optical devices configured to generate an optical beam from the electromagnetic radiation. The apparatus also includes at least one imaging sensor configured to capture an image from the optical beam. The apparatus further includes a beam generator configured to generate and transmit a high-energy laser (HEL) beam through the imaging optics. In addition, the apparatus includes an intermediate alignment target configured to be moveably positioned at the intermediate image plane of the imaging optics. The intermediate alignment target includes a first-wavelength target configured to (i) reflect a first spectral band of the HEL beam to a first imaging sensor of the at least one imaging sensor (where the first imaging sensor is configured to capture a first-wavelength infrared image of the first spectral band) and (ii) transmit remaining spectral portions of the HEL beam towards the objective lens.

In a second embodiment, a method includes focusing, using an objective lens of imaging optics, electromagnetic radiation to an intermediate image plane and generating, using the imaging optics, an optical beam from the electromagnetic radiation. The method also includes capturing, using at least one imaging sensor, an image from the optical beam. The method further includes generating and transmitting an HEL beam through the imaging optics. The method also includes reflecting, using a first-wavelength target of an intermediate alignment target moveably positioned at the intermediate image plane, a first spectral band of the HEL beam to the at least one imaging sensor. The method further includes capturing, using a first imaging sensor of the at least one imaging sensor, a first-wavelength infrared image of the first spectral band. In addition, the method includes transmitting, using the first-wavelength target, remaining spectral portions towards the objective lens.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1A through 4, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

Laser boresight alignment between sensors in high-energy laser (HEL) systems and other systems is typically very important for directed energy systems, particularly in common aperture systems. Boresights can shift over time due to various factors, such as temperature changes, shock, vibration, etc. Verifying boresight alignment often requires a laser beam to propagate out of a turret in order to verify the boresight using a see-spot or other mechanism. Other systems with bi-static apertures use retro-reflectors, where the systems transfer the alignment to a primary aperture. However, these systems may require long and exhaustive calibrations over time and temperature.

This disclosure relates to a beam director intermediate alignment target assembly configuration. As described in more detail below, by utilizing impregnated nanocrystalline glass or other intermediate alignment target placed at an intermediate image of an output telescope or other structure, a laser spot can be seen in a simulated far field, and a laser's response can be correlated back to one or more far-field or other sensors and an auto-alignment system. In some cases, this can be accomplished utilizing a system intermediate image plane of a three-mirror-anastigmat telescope while firing a laser through the intermediate image plane for purposes of alignment of the laser to a short-wavelength infrared (SWIR) sensor and a mid-wavelength infrared (MWIR) sensor. The current tracking or projection of the auto-alignment system can then be correlated to the SWIR and MWIR sensors.

Figure 1A:
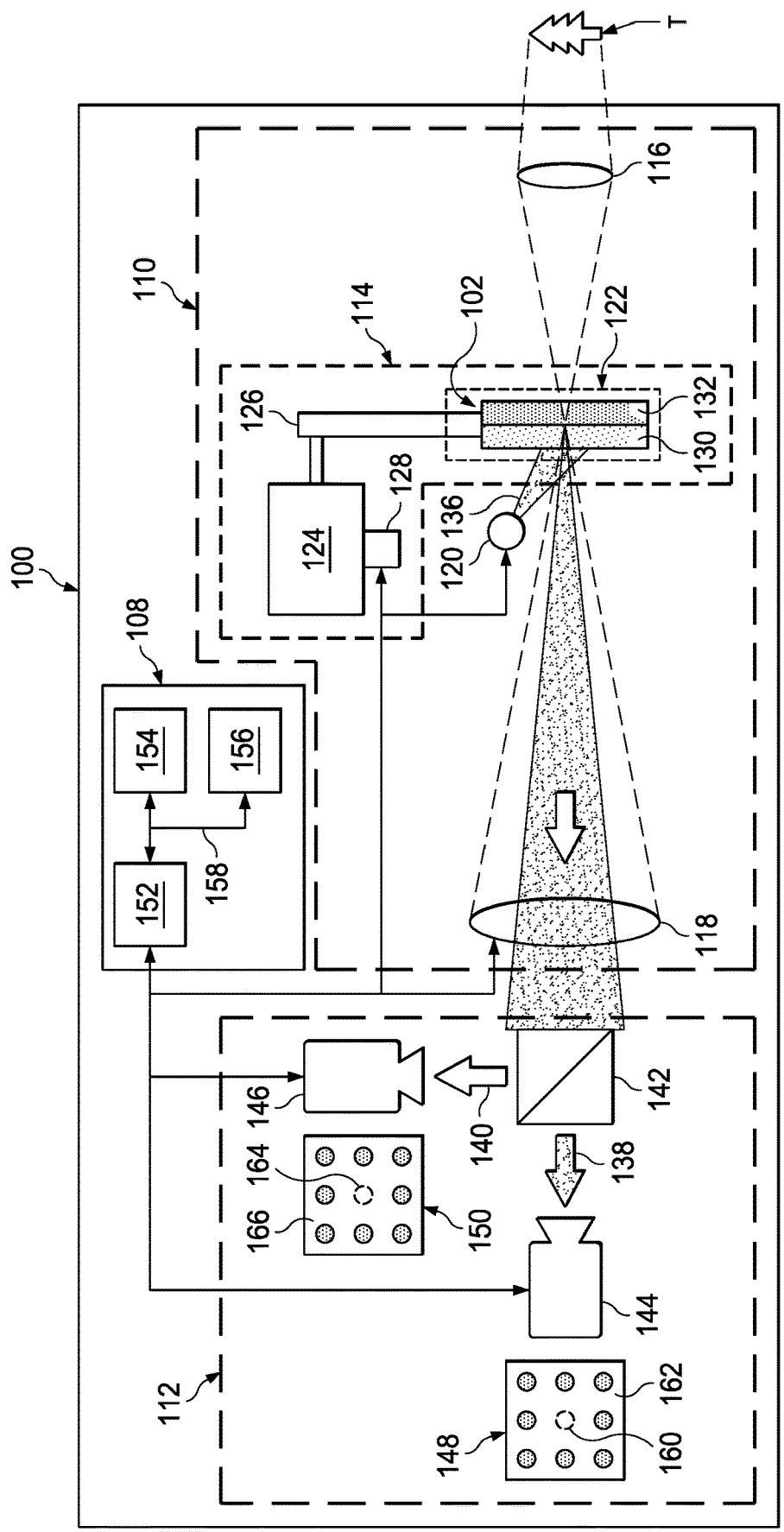
FIGS. 1A through 1C illustrate an example intermediate mirror alignment (IMA) overview of an optical system to provide an active laser internal see spot prior to full high-energy laser firing using a custom glass target and an illumination infrared source in accordance with this disclosure.
Figure 1B:
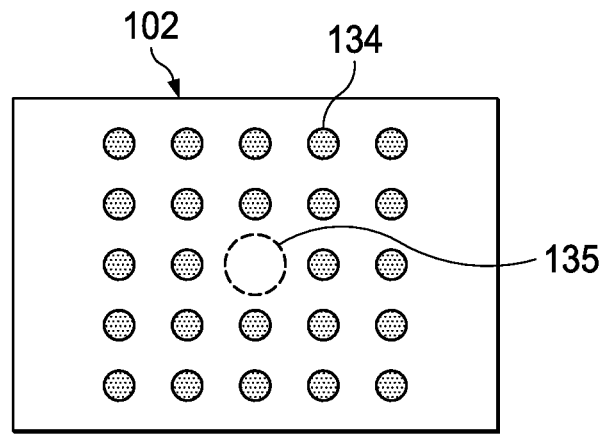
Figure 1C:
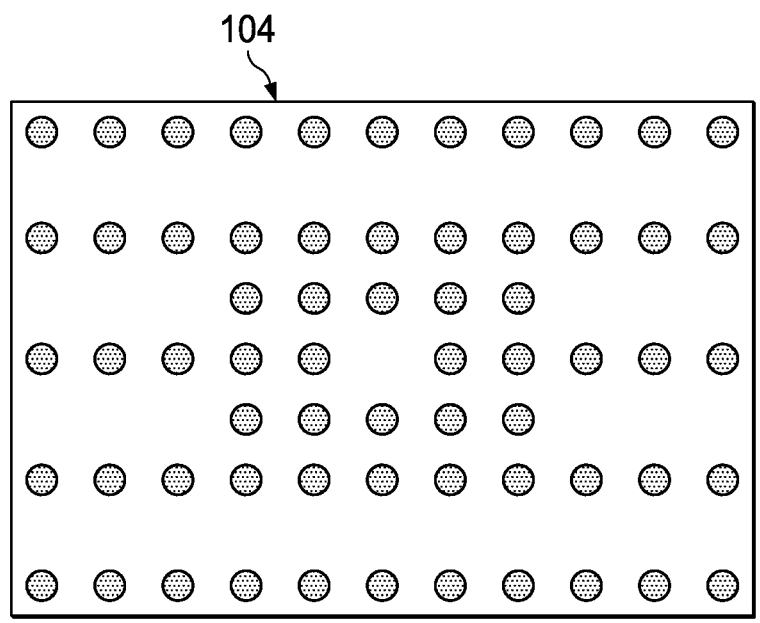

FIGS. 1A through 1C illustrate an example intermediate mirror alignment (IMA) overview of an optical system 100 to provide a target prior to full high-energy laser firing using a designed target and an illumination infrared source in accordance with this disclosure. In particular, FIG. 1A illustrates an example optical system 100, and FIG. 1B illustrates an intermediate alignment target 102 of the optical system 100. Also, FIG. 1C illustrates an example image frame 104 captured by the optical system 100.

As shown in FIGS. 1A and 1B, illustrated is an example of an optical system 100 that can include various types of an intermediate alignment target 102 described below. As shown here, the optical system 100 may also include at least one optical system processor 108, imaging optics 110, and an imaging optical system 112. The optical system 100 can provide an intermediate alignment target 102 to provide an active laser internal see spot prior to firing a high-energy laser (HEL). The optical system 100 can provide active alignment without sending any energy down range to a target T.

In this example, the imaging optics 110 includes an alignment assembly 114, a front objective lens 116, at least one optical component 118 (such as one or more lenses or mirrors), an illumination source 120, and an intermediate image plane 122. Here, the alignment assembly 114 includes the intermediate alignment target 102, an actuator 124, a support arm 126, and an alignment processor 128. The alignment assembly 114 can selectively deploy or remove the intermediate alignment target 102 from the intermediate image plane 122. FIG. 1A shows the intermediate alignment target 102 deployed at the intermediate image plane 122. The alignment assembly 114 can rotate, linearly move, or otherwise move the intermediate alignment target 102 to and from the intermediate image plane 122.

The intermediate alignment target 102 is configured to be movably positioned at or substantially at the intermediate image plane 122. In some embodiments, the intermediate alignment target 102 can be curved to approximate a curvature of the intermediate image plane 122. In particular, the intermediate alignment target 102 may be sized and shaped to substantially match or exceed the size of the intermediate image plane 122. However, in other examples, the intermediate alignment target 102 can be sized and shaped to occupy less than the full image plane, effectively reducing a spatial footprint and weight of the optical system 100. The intermediate alignment target 102 can be constructed using any suitable material(s), such as one or more metals, plastics, polymers, and composites. The intermediate alignment target 102 can be mounted to the support arm 126 directly or indirectly.

The intermediate alignment target 102 here includes a first-wavelength target 130 (such as a visible or infrared target) and a second-wavelength target 132 (such as a visible or infrared target) oriented in a direction along an optical axis. The first-wavelength target 130 can be positioned in a frontward direction along the optical axis when positioned at the intermediate image plane 122, and the second-wavelength target 132 can be place behind the first-wavelength target 130. The first-wavelength target 130 and the second-wavelength target 132 are configured to reflect illumination (such as infrared illumination) produced by the illumination source 120. In some embodiments, the first-wavelength target 130 and the second-wavelength target 132 may be integral optical layers of the intermediate alignment target 102. In other embodiments, the first-wavelength target 130 and the second-wavelength target 132 can be applied to the intermediate alignment target 102 as coatings or additional layers to a base, such as when the intermediate alignment target 102 includes a reflective paint or coating.

In various examples, the intermediate alignment target 102 can include at least one pattern of apertures 134 arranged in a surface. Some example patterns of apertures 134 are further described below with reference to FIG. 1B. The apertures 134 can extend through one or both of the first-wavelength target 130 and the second-wavelength target 132. The apertures 134 can also be formed as nonreflective surface features on one or both of the first-wavelength target 130 and the second-wavelength target 132. The apertures 134 can include a centroid aperture or centroid area 135 that corresponds to a center of the intermediate alignment target 102.

The actuator 124 is configured to move the intermediate alignment target 102 between at least an engaged position and a disengaged position. In the engaged position, the intermediate alignment target 102 substantially occupies the intermediate image plane 122 along the optical axis. In the disengaged position, the intermediate alignment target 102 is removed from the intermediate image plane 122. The support arm 126 is directly or indirectly coupled to the intermediate alignment target 102. The support arm 126 can include a slide, a filter wheel, a combination thereof, or any other movable support structure coupled to the actuator 124. The support arm 126 here is coupled to the intermediate alignment target 102 at a first end and to the actuator 124 at a second end opposite the first end. The actuator 124 can be a hydraulic, pneumatic, electric, thermal, magnetic, mechanical, or other type of actuator or a combination thereof and be configured to displace the support arm 126 in order to move the intermediate alignment target 102. The support arm 126 can be formed of any suitable material(s) or have any suitable shape for aiding the actuator 124 in displacing the intermediate alignment target 102.

The alignment processor 128 can be configured to send control signals to the actuator 124 in order to control the positioning of the support arm 126 and the attached intermediate alignment target 102. The alignment processor 128 may include at least one microprocessor, microcontroller, digital signal processor (DSP), application specific integrated circuit (ASIC), field programmable gate array (FPGA), or discrete circuitry. In some examples, the alignment assembly 114 may include any other components used to reliably move the intermediate alignment target 102 between the engaged position and the disengaged position.

To facilitate alignment, multi-spectral optical illumination 136 is created while the intermediate alignment target 102 is deployed in the engaged position. Here, the optical illumination 136 can be created by the illumination source 120. More specifically, the illumination source 120 directs optical illumination of at least a first spectral band 138 and a second spectral band 140 onto the first-wavelength target 130. The first spectral band 138 incident on a surface of the first-wavelength target 130 is reflected along the optical axis in the frontward direction. The second spectral band 140 travels through the first-wavelength target 130 to the second-wavelength target 132 and is reflected by the second-wavelength target 132 along the optical axis in the frontward direction back through the first-wavelength target 130. A third portion of the optical illumination 136 travels through the apertures 134 in both of the first-wavelength target 130 and the second-wavelength target 132. The third portion is not reflected by the intermediate alignment target 102. In some embodiments, a beam block is attached to the back of the intermediate alignment target 102. This configuration provides an image contrast within the first spectral band 138 and the second spectral band 140 that is detectable by one or more imaging sensors positioned in the frontward direction and receptive to wavelengths within the first spectral band 138 and/or the second spectral band 140.

The illumination source 120 can be positioned and configured to direct the optical illumination 136 incident upon a front surface of the first-wavelength target 130. The illumination source 120 may include one or more light emitting diodes (LEDs), incandescent bulbs, lasers, or a combination thereof configured to produce optical illumination in at least a first spectral band. In various examples, the first spectral band includes one or a combination of short-wavelength infrared radiation and middle-wavelength infrared radiation. The illumination source 120 may further include a filter or coating configured to optimize the spectral distribution curve of the provided illumination.

In various embodiments and examples described here, the illumination produced by the illumination source 120 may span one or more bands or sub-bands of the electro-magnetic spectrum. The one or more bands or sub-bands may include short-wavelength infrared (SWIR), very near infrared (VNIR), near infrared (NIR), visible light, near ultraviolet (NUV), far infrared (FIR), very long-wavelength infrared (VLWIR), long-wavelength infrared (LWIR), and mid-wavelength infrared (MWIR). In some embodiments, the first-wavelength target 130 can be designed to reflect light in the short-wavelength infrared spectrum, and the second-wavelength target 132 can be designed to reflect light in the mid-wavelength infrared spectrum.

The imaging optical assembly 112 here includes beam-steering optic(s) 142 and a plurality of imaging sensors (such as a first imaging sensor 144 and a second imaging sensor 146). While the alignment assembly 114 is shown here as being incorporated within one particular implementation of a multi-spectral reimaging optical system, various other examples of the alignment assembly 114 may be incorporated within multi-spectral optical systems having optical components and/or optical arrangements other than those of the illustrated example.

Incident electromagnetic radiation from the distant target T can be received and manipulated by the imaging optics 110 to produce an image at the intermediate image plane 122. In various examples, the electromagnetic radiation received by the imaging optics 110 enters through the front objective lens 116. The front objective lens 116 receives the electromagnetic radiation and focuses the electromagnetic radiation onto the intermediate image plane 122. In some implementations, the one or more optical components 118 can be configured to substantially reimage the received electromagnetic radiation in order to generate an output optical beam. The output optical beam from the imaging optics 110 is directed and focused to each of the first imaging sensor 144 and the second imaging sensor 146 of the imaging optical assembly 112.

As discussed, the intermediate image plane 122 is formed by the imaging optics 110. The optical system 100 includes the alignment assembly 114 having the intermediate alignment target 102, which is selectively positionable at the intermediate image plane 122. As used here, the intermediate image plane 122 is not defined as a discrete point and may include, for example, the area immediately proximate the image plane as defined by geometric optics. Accordingly, in various embodiments, positioning the intermediate alignment target 102 at the intermediate image plane 122 may not restrict the intermediate alignment target 102 to the depth of focus of the intermediate image plane 122.

The intermediate alignment target 102 may be attached to the support arm 126, which is controllable to insert the intermediate alignment target 102 into the intermediate image plane 122 such that at least one of the first-wavelength target 130 and the second-wavelength target 132 is viewable to the first imaging sensor 144 and the second imaging sensor 146 when positioned at the intermediate image plane 122. The alignment assembly 114 can also be controllable to remove the intermediate alignment target 102 from the intermediate image plane 122 such that the at least one of the first-wavelength target 130 and the second-wavelength target 132 is no longer viewable to the first imaging sensor 144 and the second imaging sensor 146. Notably, the intermediate image plane 122 is upstream from each of the first imaging sensor 144 and the second imaging sensor 146.

As further described below, images of the intermediate alignment target 102 and any pattern of apertures 134 provided by each of the first imaging sensor 144 and the second imaging sensor 146 can be used in one or more processes for correcting misalignments between the first imaging sensor 144 and the second imaging sensor 146 and/or correcting optical distortion. For example, reflections of the optical illumination 136 from a surface of the first-wavelength target 130 can provide an image contrast within a first spectral band 138 detectable by the first imaging sensor 144, and reflections of the optical illumination 136 from a surface of the second-wavelength target 132 can provide a second spectral band 140 detectable by the second imaging sensor 146. Accordingly, in various examples, the intermediate alignment target 102, when positioned at the intermediate image plane 122, is simultaneously viewable across a wide spectral range of the electromagnetic spectrum. Such an arrangement permits mutual imaging sensor alignment with a single alignment assembly.

Positioning the intermediate alignment target 102 within the imaging optics 110 and upstream from the first imaging sensor 144 and the second imaging sensor 146 enables the optical system 100 to rapidly and efficiently insert and remove the intermediate alignment target 102 from the intermediate image plane 122 with minimal interference to other system components. Deployment or retraction of the intermediate alignment target 102 may occur at any time during operation of the optical system 100.

Each of the first imaging sensor 144 and the second imaging sensor 146 may be configured to produce an image or a video stream formed at the intermediate image plane 122. For example, each of the first imaging sensor 144 and the second imaging sensor 146 may be responsive to a different spectral band and may generate an image or video stream responsive to receipt of radiation within its respective spectral band. Thus, the first imaging sensor 144 may be responsive to the first spectral band 138 and produce a first-wavelength image 148, and the second imaging sensor 146 may be responsive to the second spectral band 140 and produce a second-wavelength image 150. The beam-steering optic(s) 142, such as a dichroic beamsplitter or other beam splitting device, may be used to separate and direct the optical illumination to the appropriate imaging sensor. That is, the beam-steering optic(s) 142 can split the electromagnetic radiation received from the intermediate image plane 122 as a function of wavelength. Alternatively, the first imaging sensor 144 and the second imaging sensor 146 can share the same focal plane. In such an embodiment, the optical system 100 can be configured to activate/deactivate the first imaging sensor 144 and the second imaging sensor 146 based on a wavelength of the electromagnetic radiation received. For example, where the first imaging sensor 144 detects wavelengths within the SWIR spectral band, the first-wavelength image 148 may correspond to a SWIR image. Where the second imaging sensor 572 detects wavelengths within the MWIR spectral band, the second-wavelength image 150 may correspond to an MWIR image.

The optical system processor 108 is coupled to one or more components of the optical system 100, such as the alignment assembly 114. The optical system processor 108 is configured to facilitate implementation of various processes described here. For instance, the optical system processor 108 may provide one or more control signals to the actuator 124 that cause the actuator 124 to deploy or remove the alignment assembly 114 to or from the intermediate image plane 122. The functionality of the optical system processor 108 may be implemented in any suitable hardware or a combination of hardware and software/firmware. In some embodiments, the optical system processor 108 may include specially-programmed special-purpose hardware, such as an ASIC or other hardware tailored to perform the particular operations disclosed here. In some implementations, the optical system 100 can further include a non-transitory computer readable medium, such as a memory, that can store software or firmware instructions provided to and executed by the optical system processor 108. While the optical system processor 108 is described here separately from the alignment processor 128, the optical system processor 108 may be combined with the alignment processor 128.

In this example, the optical system processor 108 includes a system interface 152, an FPGA 154, and a memory 156. The system interface 152 may be configured to receive an image frame or a series of image frames (such as a video stream) from each imaging sensor 144, 146. Each image frame may correspond to an image formed at the intermediate image plane 122. The system interface 152 is shown as being coupled to the first imaging sensor 144 to receive a first-wavelength image 148 from the first imaging sensor 144 and coupled to the second imaging sensor 146 to receive a second-wavelength image 150 from the second imaging sensor 146. The system interface 152 includes any suitable structure to receive images.

In some embodiments, the system interface 152 receives a first-wavelength image 148 having an image contrast within the first spectral band 138 and capturing an image of the first-wavelength target 130 in the intermediate alignment target 102 deployed at the intermediate image plane 122. As described, the first-wavelength image 148 may include the pattern of apertures 134 formed in the surface of the first-wavelength target 130. Similarly, the system interface 152 is configured to receive a second-wavelength image 150 having an image contrast within the second spectral band 140 and capturing an image of the second-wavelength target 132 in the intermediate alignment target 102 deployed at the intermediate image plane 122. In some cases, the spectral bands 138 and 140 are non-overlapping, and each corresponds to the range of detectable wavelengths of the respective imaging sensor 144, 146. For example, where the first imaging sensor 144 detects wavelengths within the VNIR spectral band and/or the SWIR spectral band, the first image contrast is within the VNIR spectral band and/or the SWIR spectral band. Similarly, where the second imaging sensor 146 detects wavelengths within the MWIR spectral band, FIR spectral band, VLWIR spectral band, and/or the LWIR spectral band, the second image contrast is within the MWIR spectral band, FIR spectral band, VLWIR spectral band, and/or the LWIR spectral band.

As shown here, the FPGA 154 is coupled to the system interface 152 and the memory 156. In various examples, the FPGA 154 includes an array of programmable logic blocks (such as logical cells) that are specified to perform the various steps, acts, and functions described here. For instance, the programmable logic blocks may be interconnected with various logic gates. While shown in FIG. 1 as being separate from the FPGA 154, it will be appreciated that the memory 156 may be incorporated within the FPGA 154. For instance, the memory 156 may be implemented as one or more RAM blocks within the FPGA 154. In other examples, the FPGA 154 may include a non-volatile memory module and/or a combination of non-volatile memory components and volatile memory components.

In some embodiments, the FPGA 154 is configured to spot track a first image frame (such as an image frame corresponding to the first-wavelength image 148 provided by the first imaging sensor 144) to identify an effective centroid 160 of a first pattern 162 of apertures 134 within the first image frame. The FPGA 154 may also be configured to spot track a second image frame (such as an image frame corresponding to the second-wavelength image 150 provided by the second imaging sensor 146) to identify a second centroid 164 of a second pattern 166 of apertures 134 within the second image frame. In some cases, the FPGA 154 may spot track the entire first image frame or the entire second image frame. In other cases, the FPGA 154 may be configured to spot track a subsection of the first image frame or a subsection of the second image frame. Here, "spot tracking" includes searching a span of an image frame, or a span of a subsection of the image frame, to locate a position of a centroid within that image frame or that subsection of the image frame. It is appreciated that executing spot tracking instructions at the FPGA 154 integrated within the optical system 100 significantly decreases the processing time necessary to align one or more imaging sensors or image frames compared to typical alignment techniques. For instance, the dedicated logic of the FPGA 154 may accelerate spot tracking operations to less than one image frame of latency.

The memory 156 may be coupled to the system interface 152 and the FPGA 154. In various examples, the memory 156 is configured to store instructions and/or data during the operation of the optical system 100. For example, the memory 156 may store the image frame(s) provided by the first imaging sensor 144 and/or the second imaging sensor 146. The memory 156 may be a relatively high performance, volatile, random access memory, such as dynamic random access memory (DRAM) or static memory (SRAM). However, in other examples, the memory 156 may include any other device for storing data and/or instructions, such as non-volatile data storage (like Flash memory or phase-change memory). In some cases, instructions stored in the memory 156 may be executed by the FPGA 154. For instance, the memory 156 may include a set of software or firmware instructions that define a program to be executed by the FPGA 154 to spot track the first image frame, spot track the second image frame, and correct an optical alignment between the first imaging sensor 144 and the second imaging sensor 146 or correct an optical distortion of the first imaging sensor 144 or the second imaging sensor 146. The instructions may be persistently stored as encoded signals, and the instructions may cause the FPGA 154 to perform any of the acts, steps, or functions described here.

While not explicitly illustrated in FIG. 1, the optical system 100 may further include non-transitory data storage, such as a writeable and readable non-volatile storage medium. The non-volatile storage medium may also store software or firmware instructions and/or data. In operation, the FPGA 154 may cause the software or firmware instructions and/or data to be read from the non-volatile recording medium into another memory, such as the memory 156, that allows for faster access to the instructions and data. The storage medium may include, for example, an optical disk, a magnetic disk, or Flash memory among other examples. The FPGA 154 may manipulate the data within the memory 156 and copy the data to the storage medium after processing is complete.

Each of the system interface 152, the FPGA 154, and the memory 156 may be coupled by an interconnection element, such as a bus 158 or other connection, for exchanging data and/or instructions. The bus 158 may include one or more physical busses and may include any communication coupling between system components, including specialized or standard computing bus technologies. Thus, the bus 158 enables communications (for example, data and instructions) to be exchanged between components of the optical system 100.

As shown in FIG. 1C, examples of image frames that may be captured by the one or more imaging sensors of the optical system 100 are illustrated. For instance, FIG. 1C illustrates an image frame 104 that can have a contrast within the SWIR spectral band or the MWIR spectral band.

Although FIGS. 1A through 1C illustrate one example of an intermediate mirror alignment overview of an optical system 100 to provide an active laser internal see spot prior to full high-energy laser firing using a custom glass target and mid-wavelength infrared source, various changes may be made to FIGS. 1A through 1C. For example, the sizes, shapes, and dimensions of the components in the optical system 100 can vary as needed or desired. Also, the number and placement of various components of the optical system 100 can vary as needed or desired. As a particular example, any number of lenses, mirrors, or other optical devices may be used to redirect optical energy within the optical system 100.

Figure 2A:
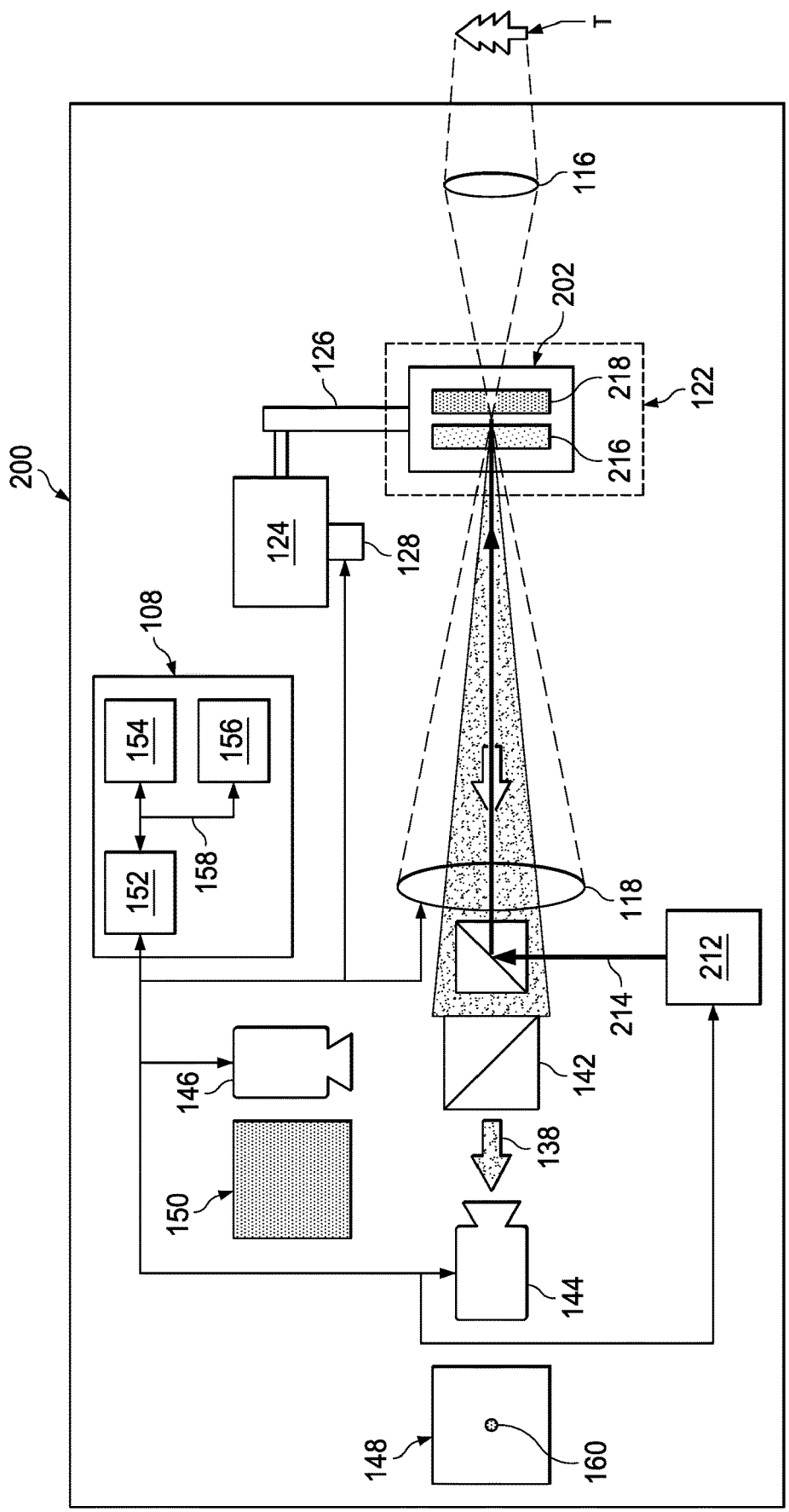
FIGS. 2A through 3F illustrate example intermediate mirror alignment improvement overviews of optical systems to provide an active laser internal see spot prior to full high-energy laser firing using a custom glass target and the high-energy laser in accordance with this disclosure.
Figure 2B:
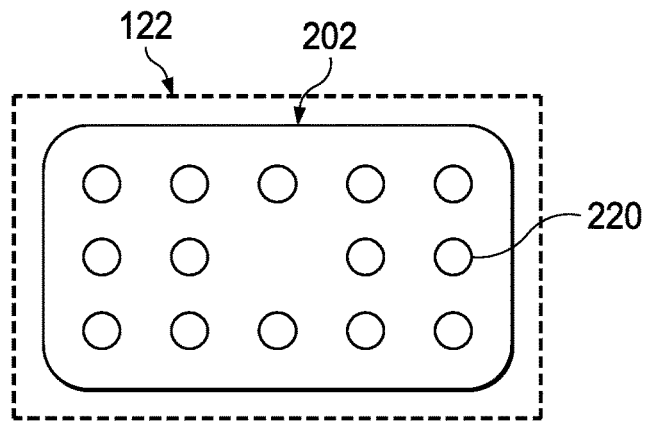
Figure 2C:
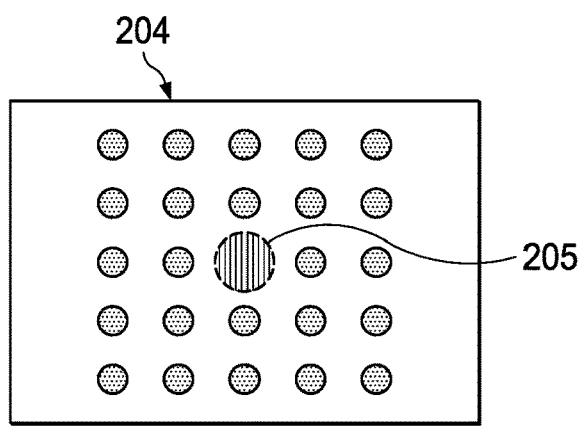
Figure 2D:
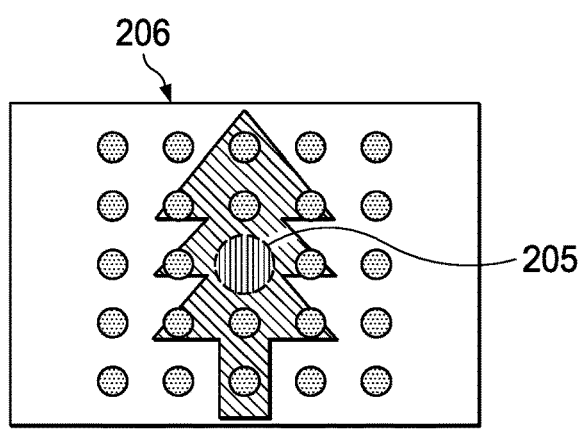
Figure 3A:
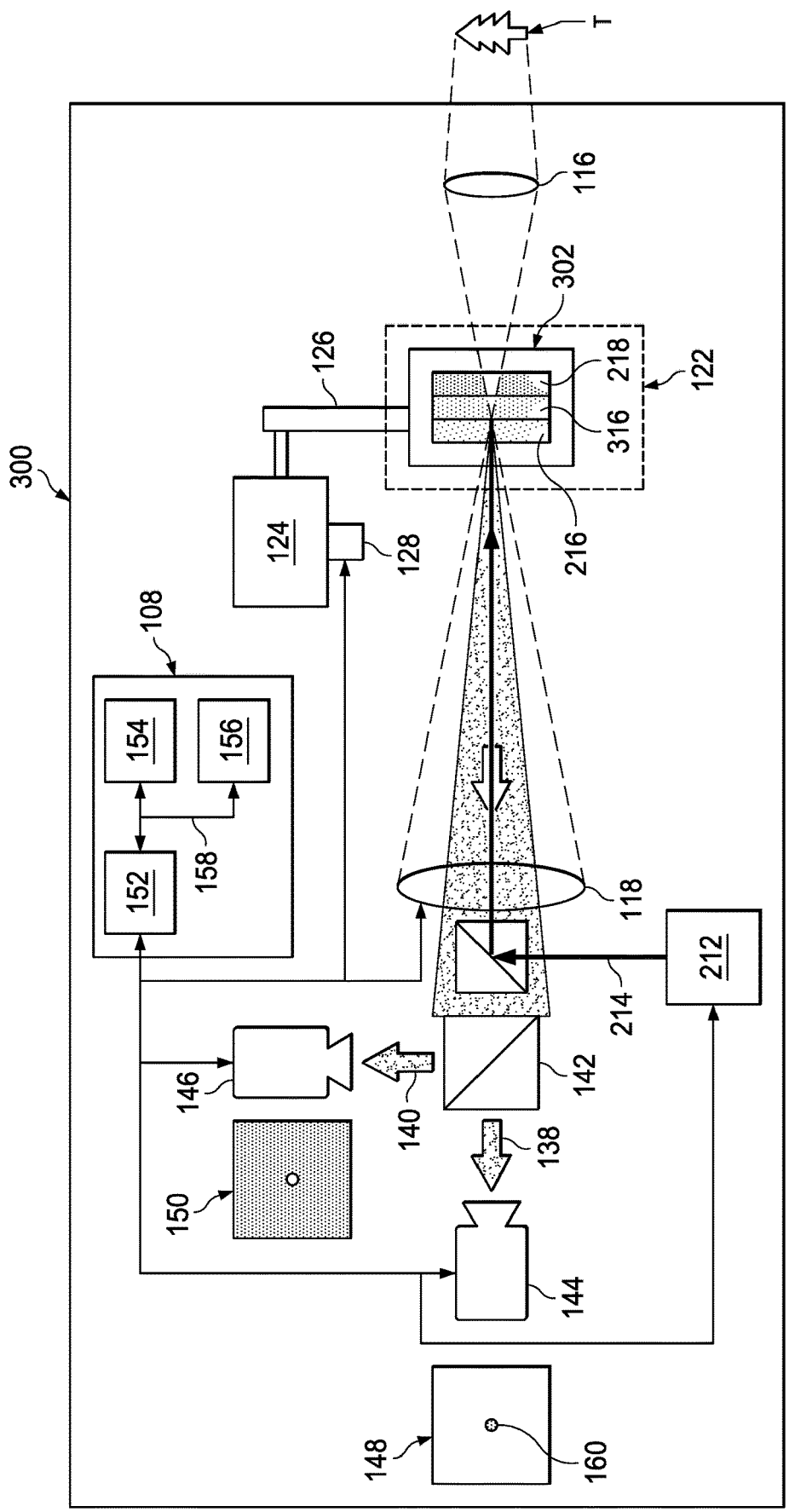
Figure 3B:
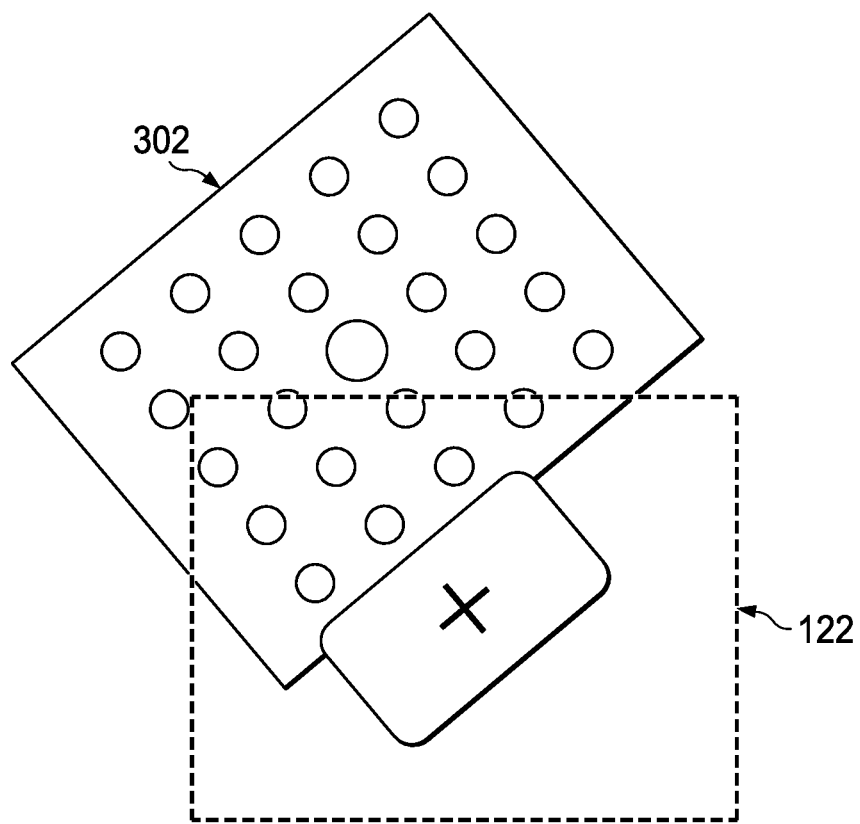
Figure 3C:
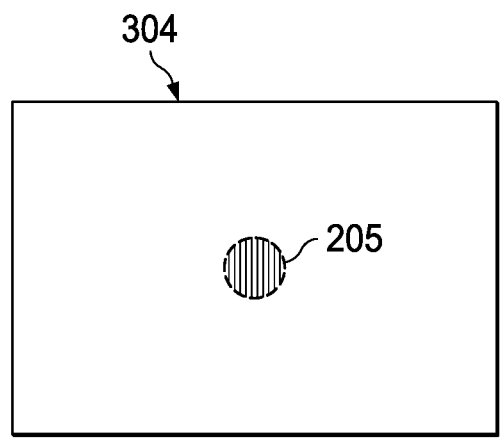
Figure 3D:
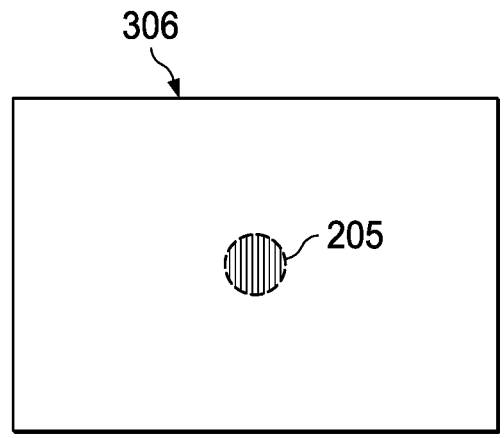
Figure 3E:
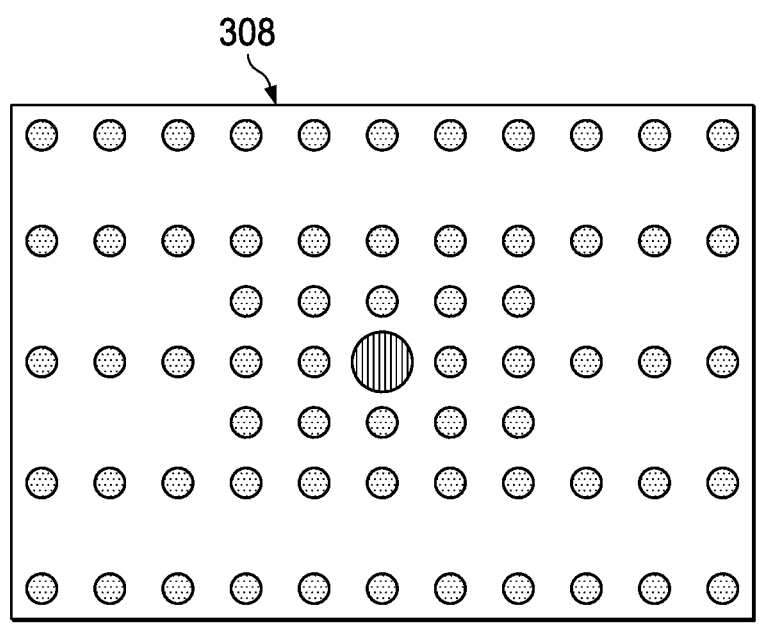
Figure 3F:
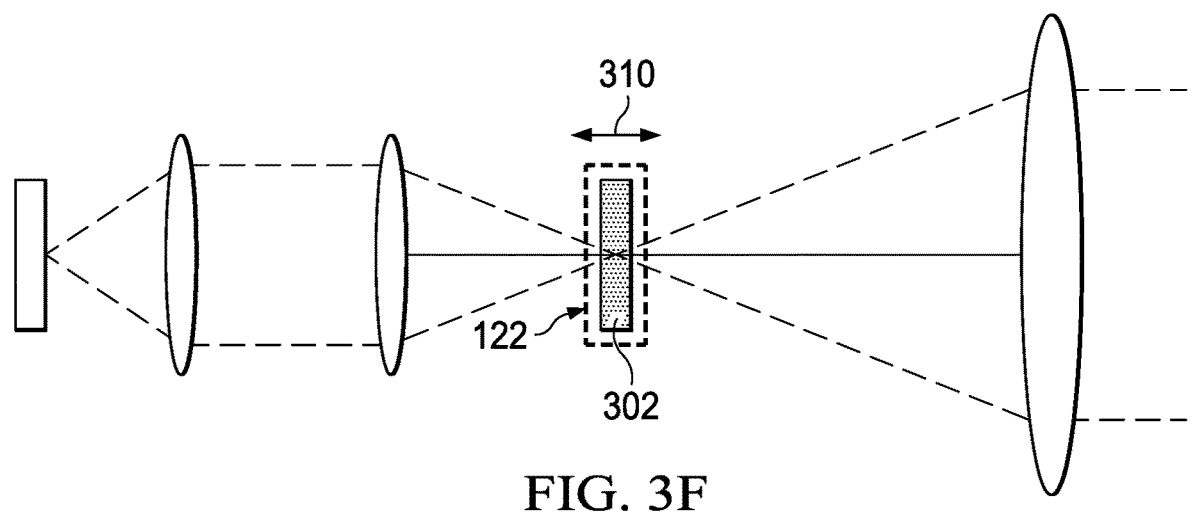

FIGS. 2A through 3F illustrate example intermediate mirror alignment improvement overviews of optical systems 200, 300 to provide an active laser internal see spot prior to full high-energy laser firing using a custom glass target and the high-energy laser in accordance with this disclosure. In particular, FIG. 2A illustrates an example optical system 200, and FIG. 2B illustrates an example intermediate alignment target 202 in the optical system 200. Also, FIG. 2C illustrates an example first-wavelength image 204 with a beam block with a fluorescing laser spot 205 from the high energy laser firing, and FIG. 2D illustrates an example first-wavelength image 206 without the beam block with the fluorescent laser spot 205 from the high energy laser firing. Moreover, FIG. 3A illustrates another example optical system 300, and FIG. 3B illustrates an example intermediate alignment target 302 in the optical system 300. Further, FIG. 3C illustrates an example first-wavelength image 304 with a beam block, and FIG. 3D illustrates an example second-wavelength image with the beam block. In addition, FIG. 3E illustrates an example sensor-to-sensor target in an image frame 308 available with a beam block, and FIG. 3F illustrates an example range 310 for an intermediate image plane 122.

As shown in FIG. 2A, the optical system 200 utilizes a beam generator 212 instead of a separate illumination source 120. The beam generator 212 can produce an HEL beam 214 for alignment with the target T. The beam generator 212 can be operably connected to and controlled by the optical system processor 108. The optical system processor 108 can control the beam generator 212 to produce the HEL beam 214 that is focused on the target T. The optical system 200 can also include an intermediate alignment target 202 (such as a visible or infrared target) and components 116, 118, 124-128, 142, 144, 146, and 152-158. The intermediate alignment target 202 is configured to be movably positioned at or substantially at the intermediate image plane 122. The intermediate alignment target 202 includes a first-wavelength target 216 and a beam block 218.

The first-wavelength target 216 can be oriented in a direction along an optical axis. The first-wavelength target 216 can therefore be positioned in a frontward direction along the optical axis when positioned at the intermediate image plane 122, and the beam block 218 can be place behind the first-wavelength target 216. The first-wavelength target 216 is configured to reflect the HEL beam 214 produced by the beam generator 212. In some embodiments, the first-wavelength target 216 may be an integral optical layer of the intermediate alignment target 202. In other embodiments, the first-wavelength target 216 can be applied to the intermediate alignment target 202 as a coating or an additional layer to a base, such as when the intermediate alignment target 202 includes a reflective paint or coating. The first-wavelength target 216 can reflect a first spectral band 138 and transmit remaining spectral bands toward the objective lens 116. The first spectral band 138 is reflected to the first imaging sensor 144, which generates the first-wavelength image 148. The first-wavelength target 216 can be formed of any suitable material(s), such as glass or other crystal, that reflects a specific spectrum of light. For example, the first-wavelength target 216 can be formed of a nanocrystal-doped glass capable of emitting SWIR photons, such as yttrium aluminum garnet (YAG) glass. The first spectral band 138 is directed from the first-wavelength target 216 to the first imaging sensor 144 through the optical components 118 and beam-steering optics 142.

The first-wavelength target 216 can include at least one surface feature 220. The surface feature(s) 220 can be etched, painted, or otherwise formed on or in a surface of the first-wavelength target 216. The surface feature(s) 220 can be formed in a pattern that is clearly identifiable in the first-wavelength image 148. The surface features 220 can be compared to a scene or can be arranged such that the pattern in centered in the first-wavelength image 148. The centering of the pattern can correlate to the alignment of the effective centroid 160. In some cases, the surface features 220 can be apertures formed in the surface of the first-wavelength target 216. The surface features 220 can also be used for increased focus sharpness.

The beam block 218 is generally used to absorb any spectral bands of the HEL beam 214. When the first-wavelength target 216 transmits the remaining spectral bands towards the front objective lens 116, the beam block 218 can absorb these remaining spectral bands. The beam block 218 and the first-wavelength target 216 can be moved into and away from the intermediate image plane collectively or individually. For example, the beam block 218 can be moved into the intermediate image plane 122 while the first-wavelength target 216 is out of the intermediate image plane 122 to effectively block the HEL beam 214 from illuminating the target T. When both of the first-wavelength target 216 and the beam block 218 are moved into the intermediate image plane 122, the first imaging sensor 144 can capture the first spectral band without the optical beam from the target, which is shown as the image frame 204 in FIG. 2C. When the first-wavelength target 216 is in the intermediate image plane 122 without the beam block 218, the first imaging sensor 144 can capture the first spectral band 138 overlaid with the optical beam from the target T, which is shown as the image frame 206 in FIG. 2D. This effectively provides a see spot on the target image without the need for transmitting the HEL beam 214 outside of the optical system 200.

As shown in FIG. 2B, the intermediate alignment target 202 covers a partial area of the intermediate image plane 122. The intermediate alignment target 202 has a pattern of surface features 220, such as apertures or other features etched or otherwise formed in or on the surface of the first-wavelength target 216. The surface features 220 shown in FIG. 2B do not include a centroid surface feature but can additionally include a centroid surface feature that is the same as or of different from the other surface features. For example, a centroid surface feature can be sized or shaped differently from the other surface features 220 to more clearly identify a center of an image captured from the first spectral band 138.

As shown in FIG. 3A, the optical system 300 can further include an intermediate alignment target 302 (such as a visible or infrared target) in addition to the other components of the optical system 200. The intermediate alignment target 302 can include a second-wavelength target 316 in addition to the first-wavelength target 216 and the beam block 218. The second-wavelength target 316 can be oriented in a direction along the optical axis. The second-wavelength target 316 can be positioned in between the first-wavelength target 216 and the beam block 218 along the optical axis when positioned at the intermediate image plane 122. While two different wavelength-specific targets are illustrated and described, additional targets of different wavelengths can be added to the intermediate alignment target 302.

The second-wavelength target 316 is configured to reflect a portion of the HEL beam 214 produced by the beam generator 212. In some embodiments, the second-wavelength target 316 may be an integral optical layer of the intermediate alignment target 202. In other embodiments, the second-wavelength target 316 can be applied to the intermediate alignment target 202 as a coating or an additional layer to a base. The second-wavelength target 316 can reflect the second spectral band 140 and transmit remaining spectral band towards the front objective lens 116. The second spectral band 140 is reflected to the second imaging sensor 146, which generates the second-wavelength image 150. The second-wavelength target 316 can be formed of any suitable material(s), such as glass or other crystal, that reflects a specific spectrum of light. For example, the second-wavelength target 316 can be formed of a short-pass filter glass, such as a KG glass. The second spectral band 140 is directed from the second-wavelength target 316 to the second imaging sensor 146 through the optical components 118 and beam-steering optics 142.

The second-wavelength target 316 can include at least one surface feature 220. The surface feature(s) 220 can be etched, painted, or otherwise formed on or in a surface of the second-wavelength target 316. The surface feature(s) 220 can be formed in a pattern that is clearly identifiable in the second-wavelength image 150. The surface features 220 can be compared to a scene or can be arranged such that the pattern in centered in the second-wavelength image 150. The centering of the pattern can correlate to the alignment of the second centroid 164. In some cases, the surface features 220 can be apertures formed in the surface of the second-wavelength target 316. The surface features 220 can also be used for increased focus sharpness.

When the second-wavelength target 316 transmits the remaining spectral bands towards the front objective lens 116, the beam block 218 can absorb these remaining spectral bands. The first-wavelength target 216, the second-wavelength target 316, and the beam block 218 can be moved into and away from the intermediate image plane 122 collectively or individually. When both of the first-wavelength target 216 and the beam block 218 are moved into the intermediate image plane 122 regardless of the positioning of the second-wavelength target 316, the first imaging sensor 144 can capture the first spectral band 138 without the optical beam from the target T, which is shown as the image frame 304 in FIG. 3C. When both of the second-wavelength target 316 and the beam block 218 are moved into the intermediate image plane 122 regardless of the positioning of the first-wavelength target 216, the second imaging sensor 146 can capture the second spectral band 140 without the optical beam from the target T, which is shown as the image frame 306 in FIG. 3D. When the first-wavelength target 216 and the second-wavelength target 316 are in the intermediate image plane 122 with the beam block 218, the first imaging sensor 144 can capture the first spectral band 138 and the second imaging sensor 146 can capture the second spectral band 140. The output of the first imaging sensor 144 and the second imaging sensor 146 can be combined, which is shown as the image frame 308 in FIG. 3E.

As shown in FIG. 3F, the imaging optics 110 of the optical system 100 can include a range 310 for the intermediate image plane 122. The intermediate image plane 122 can be adjusted based on the distance of the target T and other focus-related variables. As the focus changes, the intermediate image plane 122 can move within the range 310. To accommodate the movement of the intermediate image plane 122, the intermediate alignment target 302 can be adjusted accordingly within the range 310.

Although FIGS. 2A through 3F illustrate examples of intermediate mirror alignment improvement overviews of optical systems 200, 300 to provide an active laser internal see spot prior to full high-energy laser firing using a custom glass target and mid-wavelength infrared source, various changes may be made to FIGS. 2A through 3F. For example, the sizes, shapes, and dimensions of the components in each optical system 200, 300 can vary as needed or desired. Also, the number and placement of various components of each optical system 200, 300 can vary as needed or desired. As a particular example, any number of lenses, mirrors, or other optical devices may be used to redirect optical energy within each optical system 200, 300.

Figure 4:
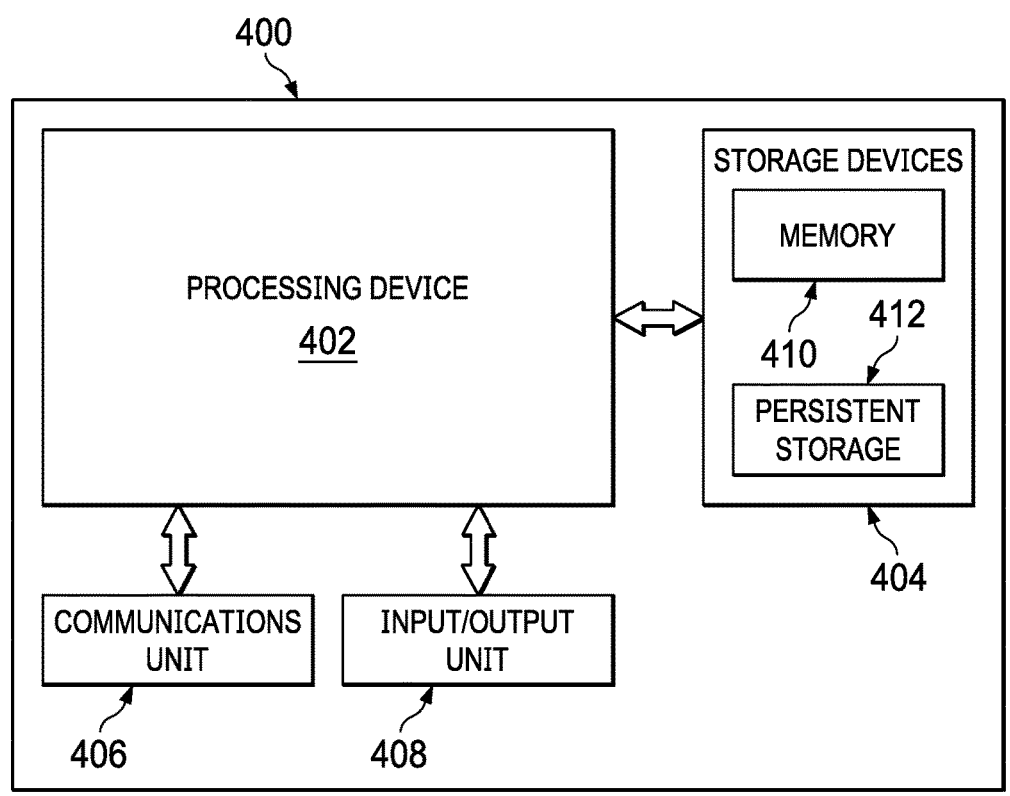
FIG. 4 illustrates an example device for a beam director intermediate alignment target assembly configuration in accordance with this disclosure.

FIG. 4 illustrates an example device 400 for a beam director intermediate alignment target assembly configuration according to this disclosure. One or more instances of the device 400 (or portions thereof) may, for example, be used to at least partially implement the functionality of the optical system processor 108 and the alignment processor 128 of FIGS. 1A, 2A, and 3A. However, this functionality may be implemented in any other suitable manner.

As shown in FIG. 4, the device 400 denotes a computing device or system that includes at least one processing device 402, at least one storage device 404, at least one communications unit 406, and at least one input/output (I/O) unit 408. The processing device 402 may execute instructions that can be loaded into a memory 410. The processing device 402 includes any suitable number(s) and type(s) of processors or other devices in any suitable arrangement. Example types of processing devices 402 include one or more microprocessors, microcontrollers, DSPs, ASICs, GPUs, FPGAs, or discrete circuitry.

The memory 410 and a persistent storage 412 are examples of storage devices 404, which represent any structure(s) capable of storing and facilitating retrieval of information (such as data, program code, and/or other suitable information on a temporary or permanent basis). The memory 410 may represent a random access memory or any other suitable volatile or non-volatile storage device(s). The persistent storage 412 may contain one or more components or devices supporting longer-term storage of data, such as a read only memory, hard drive, Flash memory, or optical disc.

The communications unit 406 supports communications with other systems or devices. For example, the communications unit 406 can include a network interface card or a wireless transceiver facilitating communications over a wired or wireless network. The communications unit 406 may support communications through any suitable physical or wireless communication link(s).

The I/O unit 408 allows for input and output of data. For example, the I/O unit 408 may provide a connection for user input through a keyboard, mouse, keypad, touchscreen, or other suitable input device. The I/O unit 408 may also send output to a display or other suitable output device. Note, however, that the I/O unit 408 may be omitted if the device 400 does not require local I/O, such as when the device 400 can be accessed remotely or operated autonomously.

Although FIG. 4 illustrates one example of a device 400 for a beam director intermediate alignment target assembly configuration, various changes may be made to FIG. 4. For example, computing devices and systems come in a wide variety of configurations, and FIG. 4 does not limit this disclosure to any particular computing device or system.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An apparatus comprising:
    imaging optics comprising (i) an objective lens configured to focus electromagnetic radiation to an intermediate image plane and (ii) one or more optical devices configured to generate an optical beam from the electromagnetic radiation;
    at least one imaging sensor configured to capture an image from the optical beam;
    a beam generator configured to generate and transmit a laser beam through the imaging optics; and
    an intermediate alignment target configured to be moveably positioned at the intermediate image plane of the imaging optics, the intermediate alignment target comprising:
        a first-wavelength target configured to:
            reflect a first spectral band of the laser beam to a first imaging sensor of the at least one imaging sensor, the first imaging sensor configured to capture a first-wavelength infrared image of the first spectral band; and
            transmit remaining spectral portions of the laser beam towards the objective lens; and
        a beam block located on a side of the first-wavelength target closer to the objective lens and configured to:
            move into and away from the intermediate image plane independent of the first-wavelength target; and
            block the remaining spectral portions from the objective lens when moved into the intermediate image plane.

2. The apparatus of claim 1, wherein the intermediate alignment target is larger than the intermediate image plane.

3. The apparatus of claim 1, wherein the first spectral band is one of: a short-wavelength infrared (SWIR) band, a very near infrared (VNIR) band, a near infrared (NIR) band, a visible light band, or a near ultraviolet (NUV) band.

4. The apparatus of claim 1, wherein:
    the first spectral band is a short-wavelength infrared (SWIR) band; and
    the first-wavelength target comprises yttrium aluminum garnet (YAG) glass.

5. The apparatus of claim 1, wherein the first-wavelength target comprises surface features configured to reflect the first spectral band differently compared to portions of the first-wavelength target that do not have the surface features.

6. The apparatus of claim 1, wherein the first imaging sensor is configured to capture the first-wavelength infrared image of the first spectral band overlaid with the optical beam when the beam block is moved out of the intermediate image plane.

7. The apparatus of claim 1, further comprising:
    at least one processor configured to align the laser beam using the first-wavelength infrared image.

8. The apparatus of claim 1, wherein the intermediate alignment target further comprises a second-wavelength target configured to:
reflect a second spectral band of the laser beam to a second imaging sensor of the at least one imaging sensor, the second imaging sensor configured to capture a second-wavelength infrared image of the second spectral band; and
transmit remaining spectral portions towards the objective lens.

9. The apparatus of claim 8, further comprising:
at least one processor configured to align the laser beam using the first-wavelength infrared image and the second-wavelength infrared image.

10. The apparatus of claim 9, wherein the at least one processor is further configured to align the first imaging sensor and the second imaging sensor based on a comparison of the first-wavelength infrared image and the second-wavelength infrared image.

11. A method comprising:
focusing, using an objective lens of imaging optics, electromagnetic radiation to an intermediate image plane;
generating, using the imaging optics, an optical beam from the electromagnetic radiation;
capturing, using at least one imaging sensor, an image from the optical beam;
generating and transmitting a laser beam through the imaging optics;
reflecting, using a first-wavelength target of an intermediate alignment target moveably positioned at the intermediate image plane, a first spectral band of the laser beam to the at least one imaging sensor;
capturing, using a first imaging sensor of the at least one imaging sensor, a first-wavelength infrared image of the first spectral band;
transmitting, using the first-wavelength target, remaining spectral portions towards the objective lens;
moving a beam block into and away from the intermediate plane independent of the first-wavelength target, wherein the beam block is located on a side of the first-wavelength target closer to the objective lens; and
blocking, using the beam block, the remaining spectral portions from the objective lens when the beam block is moved into the intermediate image plane.

12. The method of claim 11, wherein the intermediate alignment target is larger than the intermediate image plane.

13. The method of claim 11, wherein the first spectral band is one of: a short-wavelength infrared (SWIR) band, a very near infrared (VNIR) band, a near infrared (NIR) band, a visible light band, or a near ultraviolet (NUV) band.

14. The method of claim 11, wherein:
the first spectral band is a short-wavelength infrared (SWIR) band; and
the first-wavelength target comprises yttrium aluminum garnet (YAG) glass.

15. The method of claim 11, wherein the first-wavelength target comprises surface features configured to reflect the first spectral band differently compared to portions of the first-wavelength target that do not have the surface features.

16. The method of claim 11, further comprising:
reflecting, using a second-wavelength target of the intermediate alignment target, a second spectral band of the laser beam;
capturing, using a second imaging sensor of the at least one imaging sensor, a second-wavelength infrared image of the second spectral band; and
transmitting, using the second-wavelength target, remaining spectral portions towards the objective lens.

17. The method of claim 16, further comprising:
aligning the laser beam using at least one of the first-wavelength infrared image and the second-wavelength infrared image.

18. The method of claim 17, further comprising:
aligning the first imaging sensor and the second imaging sensor by comparing the first-wavelength infrared image and the second-wavelength infrared image.

19. The method of claim 11, wherein the first imaging sensor is configured to capture the first-wavelength infrared image of the first spectral band overlaid with the optical beam when the beam block is moved out of the intermediate image plane.

20. The method of claim 11, further comprising:
aligning the laser beam using the first-wavelength infrared image.

* * * * *